United States Patent [19]

König et al.

[11] Patent Number: 6,060,573
[45] Date of Patent: May 9, 2000

[54] POLYISOCYANATES BLOCKED WITH CH-ACIDIC ESTERS AND STABILIZED AGAINST THERMAL YELLOWING

[75] Inventors: Eberhard König, Leverkusen; Claus Kobusch, Meerbusch; Wolfram Küttner, Bergisch Gladbach, all of Germany

[73] Assignee: Bayer Aktiengesellschaft, Leverkusen, Germany

[21] Appl. No.: 09/271,088

[22] Filed: Mar. 17, 1999

[30] Foreign Application Priority Data

Mar. 26, 1998 [DE] Germany ............................ 198 13 352

[51] Int. Cl.⁷ .................................................. C08G 18/80
[52] U.S. Cl. ........................ 528/45; 528/73; 252/182.2; 524/770; 524/772; 560/158; 560/331
[58] Field of Search .................. 528/45, 73; 252/182.2; 524/772, 770; 560/331, 158

[56] References Cited

U.S. PATENT DOCUMENTS 4,518,522  5/1985  Markusch et al. ................. 252/188.31
4,677,180  6/1987  Schlmitt el al. ............................ 528/45
5,350,825  9/1994  Konig et al. ................................ 528/45
5,523,377  6/1996  König et al. ................................ 528/45

FOREIGN PATENT DOCUMENTS 2215649  3/1998  Canada .

*Primary Examiner*—Rachel Gorr
*Attorney, Agent, or Firm*—Joseph C. Gil; Thomas W. Roy

[57] ABSTRACT

The present invention relates to a stabilized, aliphatic and/or cycloaliphatic, blocked polyisocyanates which have i) isocyanate groups blocked with CH-acidic esters, ii) a content of blocked isocyanate groups (calculated as NCO, MW 42) of 5 to 20, preferably 7 to 15 wt. %, based on the solids content of the blocked polyisocyanate and iii) a content of formaldehyde of 0.1 to 5 wt. %, based on the solids content of the blocked polyisocyanate.

The present invention also related to a process for the preparation of these stabilized, blocked polyisocyanates and to their use in one-component polyurethane stoving compositions, which may be cured at relatively low stoving temperature of about 100° C., as crosslinking agents for organic polyhydroxy compounds.

4 Claims, No Drawings

POLYISOCYANATES BLOCKED WITH CH-ACIDIC ESTERS AND STABILIZED AGAINST THERMAL YELLOWING

BACKGROUND OF THE INVENTION

1. Field of the Invention

The present invention relates to polyisocyanates which are blocked with CH-acidic esters and stabilized with formaldehyde against thermal yellowing, to a process for their preparation and to their use in one-component coating compositions.

2. Description of the Prior Art

The use of malonic esters or malonates as blocking agents for isocyanates is known and disclosed, e.g., in Liebigs An. Chem. 562 (1949) p. 205 et seq. A specific, more recent variant of this type of blocking is described, for example, in EP-A 600,314. The advantages of polyisocyanate crosslinking agents blocked with CH-acid esters is that crosslinking temperatures of about 100° C. are achieved and these blocking agents are easy to handle on a large industrial scale.

Blocked polyisocyanates with low crosslinking temperatures of about 100° C. would represent an attractive industrial alternative to melamineformaldehyde resins if they did not tend to yellow due to the presence of the blocking agent.

It is known that one-component polyurethane stoving lacquers containing polyisocyanates, which are blocked with malonic esters and/or acetoacetic esters, can severely yellow when cured, especially when they are overstoved. It is known from DE-A 19 637 334 that the yellowing can be reduced or prevented by the addition to blocked isocyanates of hydrazides and HALS amines which are unsubstituted on the N atom. However, these blocked isocyanates cannot be employed for all car painting applications.

An object of the invention is to provide polyisocyanates which are blocked with CH-acid esters and show no tendency towards thermal yellowing.

This object can be achieved with the stabilized, blocked polyisocyanates according to the present invention which contain formaldehyde.

SUMMARY OF THE INVENTION

The present invention relates to a stabilized, aliphatic and/or cycloaliphatic, blocked polyisocyanates which have
  i) isocyanate groups blocked with CH-acidic esters,
  ii) a content of blocked isocyanate groups (calculated as NCO, MW 42) of 5 to 20, preferably 7 to 15 wt. %, based on the solids content of the blocked polyisocyanate and
  iii) a content of formaldehyde of 0.1 to 5 wt. %, based on the solids content of the blocked polyisocyanate.

The present invention is also related to a process for the preparation of these stabilized, blocked polyisocyanates from
  a) aliphatic and/or cycloaliphatic polyisocyanates and (based on the equivalents of NCO),
  b) 85 to 100 equivalent % of a blocking agent selected from CH-acidic esters,
  c) 0 to 15 equivalent % of a compound containing hydrazide groups, which may contain isocyanate-reactive groups,
  d) 0 to 5 wt. %, based on the blocked polyisocyanate, of hindered amine light stabilizers containing one or more groups corresponding to formula (I) and
  e) 0.1 to 5.0 wt. %, based on the blocked polyisocyanate, of formaldehyde, wherein formaldehyde e) is added after the reaction between components a) and b) is complete.

Finally, the present invention relates to one-component polyurethane stoving compositions, which may be cured at relatively low stoving temperature of about 100° C. and which contain the blocked polyisocyanates according to the invention as crosslinking agents for organic polyhydroxy compounds.

DETAILED DESCRIPTION OF THE INVENTION

The presence of formaldehyde is essential to prevent yellowing of the polyisocyanate crosslinking agent. The amount of formaldehyde is generally 0.1 to 5 wt. %, preferably 0.5 to 2.0 wt. % and more preferably 0.8 to 1.2 wt. %, based on the weight of the blocked polyisocyanate. The preferred range generally corresponds to 0.05 to 0.2 moles of paraformaldehyde for each equivalent of blocked isocyanate groups.

In addition to formaldehyde A) the blocked polyisocyanates may also contain up to 10.0 wt. % of a 1:10 to 10:1 stabilizer mixture of
  a) hindered amine light stabilizers (HALS) containing one or more groups corresponding to formula I and

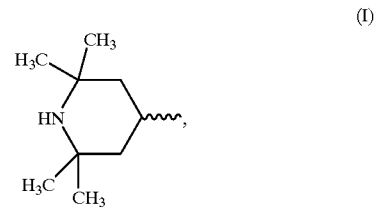

b) compounds containing hydrazide groups.

The process according to the invention is carried out by initially introducing the polyisocyanate component into a reaction vessel together with a small amount of solvent, e.g. 1-methoxy-2-propyl acetate, at about 50° C.

The CH-acidic ester, such as malonic acid diethyl ester, is added in admixture with a base, e.g., a 2% of a 30% Na methylate solution. The reaction is carried out at an elevated temperature of 60 to 90° C. until all of the NCO groups have been blocked. If a hydrazide stabilizer is incorporated via OH groups, it is preferred to block 90 equivalent % of the polyisocyanate component with the CH-acidic ester and then react the remaining 10 NCO equivalent % with the OH groups of the hydrazide stabilizer.

When all of the isocyanate groups have been reacted or blocked, paraformaldehyde, dissolved in a solvent (such as isobutanol) and a small amount of a base (about 3%, based on the paraformaldehyde), is added to the blocked polyisocyanate at 40 to 50° C. The mixture is subsequently stirred at 40° C. for about 30 minutes and a pH of about 7.5 to 7.0 is established with about 3 g dibutyl phosphate. Other stabilizers (such as the HALS amines) can also be added to this solution.

The resulting stabilized, blocked polyisocyanates are clear, pale yellow solutions with good storage stability. The formaldehyde, which is essential to the invention, is present on the blocked polyisocyanate in bonded form. Only 0.001% free formaldehyde can be measured by analysis.

The starting polyisocyanates for preparing the blocked polyisocyanates include the known lacquer polyisocyanates having aliphatically and/or cycloaliphatically bound isocyanate groups and an isocyanate content of 7 to 30, preferably 12 to 25 wt. %. Preferred lacquer polyisocyanates are those containing biuret, isocyanurate and/or uretdione groups and prepared from 1,6-diisocyanatohexane (HDI), 1-isocyanato-3,3,5-trimethyl-5-isocyanatomethyl-cyclohexane (IPDI) and/or bis-(4-isocyanatocyclohexyl)-methane (HMDI or Desmodur W diisocyanate, available from Bayer AG). Lacquer polyisocyanates which contain asymmetric trimers, i.e., aminooxadiazinedione groups, in addition to isocyanurate groups and which have been prepared from 1,6-diisocyanatohexane as described, e.g., in EP-A 798,299, can also be used as the starting polyisocyanate.

Particularly preferred polyisocyanate components are polyisocyanates containing isocyanurate groups and prepared primarily from Desmodur W and small contents of IPDI and HDI, such as the mixed trimer of HMDI, IPDI and HDI in a weight ratio of 7:2:1.

Suitable blocking agents include CH-acidic esters, such as malonic acid diethyl ester or acetoacetic acid ethyl ester or the corresponding methyl, isopropyl, isobutyl or tert-butyl esters. Malonic acid diethyl ester and acetoacetic acid ethyl ester are preferred.

Formaldehyde, preferably in the form of paraformaldehyde, is employed as the stabilizing component.

The stabilizers disclosed in DE-A 19,637,334 (U.S. Ser. No. 08/922,818, herein incorporated by reference) may also be employed as stabilizing components. Examples include the hydrazide corresponding to the formula

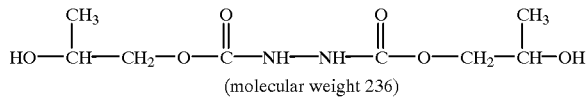

(molecular weight 236)

This latter hydrazide may be prepared by the addition of hydrazine hydrate on to 2 moles propylene carbonate and can be incorporated. Also disclosed in this reference are the stabilizers corresponding to formula I which contain one or more 2,2,6,6-tetramethyl-piperydinyl radicals wherein the piperidinyl nitrogen is unsubstituted.

Preferred stabilizers are the hydrazide corresponding to the preceding formula and the HALS amine, Tinuvin 770 DF® (Novartis), which is unsubstituted on the N atom. The hydrazide stabilizers are preferably present in an amount of 3 to 6 wt. % and the HALS stabilizers are present in an amount of 0.5 to 1.5 wt. %, wherein the percentages are based on weight of the blocked polyisocyanate.

Suitable solvents are known from polyurethane chemistry, are inert to NCO groups and include 1-methoxy-2-propyl acetate, solvent naphtha 100 and butyl acetate. After the NCO groups are blocked, alcohols (such as isobutanol) may also preferably be used in order to allow transesterification with the alcohol radicals of the blocking agent.

The significantly improved stability to thermal yellowing of the polyisocyanate crosslinking agents according to the invention is illustrated by the following examples.

EXAMPLES

Example 1 (according to the invention)

The blocked polyisocyanate was stabilized with 0.9% formaldehyde, based on the solids content of the blocked polyisocyanate, and with two other stabilizers described in DE-A 19,637,334 (U.S. Ser. No. 08/922,818), i.e., 4.2% of the hydrazide stabilizer was incorporated into the blocked polyisocyanate and 1.0% of a HALS amine was mixed with the blocked polyisocyanate solution.

A) Preparation of the Starting Polyisocyanate Batch:

| | | |
|---|---|---|
| 700.0 g | (5.34 eq) | bis-(4-isocyanatocyclohexyL)-methane (HMDI) |
| 200.0 g | (1.80 eq) | 1-isocyanato-3,3,5-trimethyl-5-isocyanatomethyl cyclohexane (IPDI) |
| 1000.0 g | (1.19 eq) | 1,6-diisocyanatohexane (HDI) |
| 1000.0 g | (8.33 eq) | diisocyanate mixture, NCO content (calculated): 34.98% |
| | −(2.92 eq) | 70% trimerization of half of the NCO groups present with about 2.5 g of a 5% solution of benzyl-trimethyl-ammonium hydroxide in n-butanol |
| 1000.0 g | (5.41 eq) | NCO content (measured): 22.7% |
| 250.0 g | | Methoxypropyl acetate |
| 1250.0 g | (5.36 eq) | NCO content (measured): 18.0% 80% solution of a mixed polyisocyanate containing isocyanurate groups |

Procedure:

To eliminate dissolved, weakly acidic carbon dioxide the diisocyanate mixture was degassed under vacuum at room temperature, while stirring, "aerated" with nitrogen and heated to about 70° C. The catalyst solution was finely metered in until the trimerization reaction started up exothermically. The reaction was kept at 80 to 86° C. by occasional further additions of catalyst until, after about 1.5 hours, the NCO content had fallen to the calculated value of 22.7%. The mixture was diluted with methoxy-propyl acetate and a pale yellow, slightly cloudy solution of a mixed, trimerized lacquer polyisocyanate was obtained, which had a viscosity (23° C.) of about 1,000 mPa·s, an NCO content of about 18.0% and an NCO equivalent of about 233.0 g.

B) Preparation of the Stabilized, Blocked Polyisocyanate Batch:

| | | |
|---|---|---|
| 233.0 g | (1.0 eq) | polyisocyanate solution from example 1A) |
| 148.0 g | (0.925 mole) | malonic acid diethyl ester, catalyzed with 3 g of a 30% Na methylate solution in methanol |
| 14.2 g | (0.12 eq) | of the hydrazine adduct described in the text from 1 mole hydrazine hydrate and 2 moles propylene carbonate, of molecular weight 236 |
| 3.5 g | | HALS amine (Tinuvin 770 DF, Novartis AG) |
| 71.8 g | | methoxypropyl acetate |
| 3.0 g | (0.1 mole) | paraformaldehyde, dissolved in the following amount of isobutanol and 0.1 g Na methylate solution (30%) |
| 118.4 g | | isobutanol |
| 3.0 g | | dibutyl phosphate |
| 594.9 g | (0.925 eq) | blocked NCO groups |

| | | |
|---|---|---|
| | solids content: | calc. 60% |
| | blocked NCO content: | 6.5% |
| | viscosity (23° C.): | about 900 mPa · s |
| | appearance: | clear, Hazen 55 |
| | NCO equivalent (blocked): | 645 g |

Procedure:

The polyisocyanate solution from Example 1A) was heated to about 50° C., while stirring. The mixture of malonic acid diethyl ester and Na methylate solution was added in portions. The blocking reaction was initially exothermic. The addition was metered in such that the temperature rose to 70° C., and the mixture was then subsequently stirred at about 70° C. for a further 3 hours until the NCO content had fallen to about 0.85% (calculated— 0.82%). The hydrazine adduct was then added in one amount and the mixture was stirred at 80° C. for 10 hours until no further NCO content was detectable by IR spectroscopy. The mixture was allowed to cool to about 50° C. The clear solution of paraformaldehyde, isobutanol and the Na methylate solution was added and the mixture was subsequently stirred at about 40° C. for 30 min. Dibutylphosphoric acid was then added to obtain a pH of 7.6.

The resulting solution was clear (Hazen color number about 55) and had a viscosity (23° C.) of about 900 mPa·s, a calculated solids content of 60% and a calculated (blocked) NCO equivalent weight of about 645 g.

Example 2 (Comparison)

Example 1B was repeated with the exception that paraformaldehyde was not added. The resulting product had a calculated (blocked) NCO equivalent weight of 640 g.

Example 3

This example demonstrates the preparation of clear paints by means of the polyisocyanate crosslinking agents according to example 1 and 2 and the difference in the thermal yellowing.

| Clear coating composition formulation (parts by wt.) | 1 | 2 |
|---|---|---|
| Hydroxy-functional copolymer (Desmophen A 665, Bayer AG ,65% soln. in butyl acetate/xylene, OH eq wt. 567 g) | 82.61 | 82.61 |
| Baysilonol OL 17, 10% soln. in xylene, Bayer AG | 1.10 | 1.10 |
| DBTL, 10% soln. in methoxypropyl acetate (MPA), Chemische Werke München | 5.48 | 5.48 |
| Benzotriazole light stabilizer (Tinuvin 1130 Novartis, 10% in MPA | 10.96 | 10.96 |
| HALS (Tinuvin 292, Novartis, 10% in MPA) | 10.96 | 10.96 |
| Methoxy propyl acetate (MPA) | 22.81 | 22.16 |
| Butyl acetate | 22.81 | 22.76 |
| Blocked polyisocyanate from Ex. 2, NCO eq. wt. 640 g | 93.25 | — |
| Blocked polyisocyanate from Ex. 1, NCO eq. wt. 645 g | — | 93.97 |
| Total weight | 250.00 | 250.00 |

Blocked NCO:OH equivalent ratio 1:1

A film having a wet film thickness of about 90 μm was applied to a glass plate using a commercially available coating roller and, after evaporation for 1 minute at 23° C., was stoved in a circulating air oven at 100° C. for 30 minutes. The b values (yellowing) of the paints were measured by the CieLab method. The same plates were then overstoved at 160° C. for 30 minutes and the corresponding b values were measured again by the CieLab method. The difference in the b values, i.e., Δb values, for coatings 1 and 2 were as follows (higher Δb value corresponding to more severe yellowing):

|  | Paint | |
|---|---|---|
|  | 1 (comparison) | 2(according to the invention) |
| Δ b values by the CieLab method between 30'/100° C. and 30'/160° C. | 2.6 | 0.5 |

It can be seen that coating 2, which was prepared from the formaldehyde-stabilized polyisocyanate crosslinking agent, had a significantly lower Δb value of only 0.5. Coating 2 combines the following advantages:

low stoving temperature of 30 min at 100° C.

good resistance to overstoving, Δb value only 0.5 good paint properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stabilized, aliphatic and/or cycloaliphatic, blocked polyisocyanate which has i) isocyanate groups blocked with CH-acidic esters, ii) a content of blocked isocyanate groups (calculated as NCO, MW 42) of 5 to 20 wt. %, based on the solids content of the blocked polyisocyanate and iii) a content of formaldehyde of 0.1 to 5 wt. %, based on the solids content of the blocked polyisocyanate.

2. The blocked polyisocyanate of claim 1 which additionally contains a positive amount of up to 10.0 wt. % of a 1:10 to 10:1 stabilizer mixture comprising a) a hindered amine light stablizer (HALS) containing one or more groups corresponding to formula I and

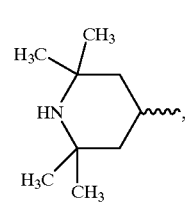

(I)

b) a compound containing hydrazide groups.

3. A process for the preparation of the blocked polyisocyanate of claim 1 from a) an aliphatic and/or cycloaliphatic polyisocyanate with (based on the equivalents of NCO groups)

b) 85 to 100 equivalent % of a blocking agent comprising a member selected from the group consisting of CH-acid esters, c) 0 to 15 equivalent % hydrazide compounds, which may contain isocyanate-reactive groups, d) 0 to 5 wt. %, based on the blocked polyisocyanate, of hindered amine light stabilizers containing one or more groups corresponding to formula I

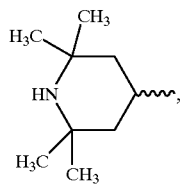
(I)
and
e) 0.1 to 5.0 wt. %, based on the blocked polyisocyanate, of formaldehyde
which comprises adding formaldehyde e) after the reaction between components a) and b) is complete.
4. A one-component polyurethane stoving compositions, which may be cured at about 100° C. and which contains the blocked polyisocyanate of claim 1 and an organic polyhydroxy compound.
* * * * *